(12) United States Patent
Kumagai

(10) Patent No.: US 8,379,308 B2
(45) Date of Patent: Feb. 19, 2013

(54) ROLLED WEB OF OPTICAL FILM AND METHOD OF PRODUCING THE SAME

(75) Inventor: Daisuke Kumagai, Ibaraki (JP)

(73) Assignee: Nitto Denko Corporation, Ibaraki-shi (JP)

( * ) Notice: Subject to any disclaimer, the term of this patent is extended or adjusted under 35 U.S.C. 154(b) by 685 days.

(21) Appl. No.: 12/564,543

(22) Filed: Sep. 22, 2009

(65) Prior Publication Data

US 2010/0073770 A1 Mar. 25, 2010

(30) Foreign Application Priority Data

Sep. 25, 2008 (JP) .................................. 2008-246428

(51) Int. Cl.
*G02B 5/30* (2006.01)
(52) U.S. Cl. .............. 359/483.01; 359/489.07; 359/601; 359/900
(58) Field of Classification Search ............ 359/483.01, 359/487.06, 489.07, 493.01, 599, 601, 896, 359/900
See application file for complete search history.

(56) References Cited

U.S. PATENT DOCUMENTS

| | | | |
|---|---|---|---|
| 2004/0013337 A1* | 1/2004 | Purchase et al. ................ | 385/14 |
| 2009/0174846 A1* | 7/2009 | Ito .................................... | 349/96 |
| 2009/0290100 A1* | 11/2009 | Haruta et al. .................... | 349/75 |
| 2010/0014164 A1* | 1/2010 | O'Brien ........................... | 359/599 |
| 2010/0188754 A1* | 7/2010 | Gehlsen et al. .................. | 359/599 |
| 2011/0149554 A1* | 6/2011 | Ouderkirk et al. .............. | 362/97.1 |

FOREIGN PATENT DOCUMENTS

| | | |
|---|---|---|
| JP | 06-289221 A | 10/1994 |
| JP | 11-231129 A | 8/1999 |
| JP | 2006-130809 A | 5/2006 |
| JP | 2007-219022 A | 8/2007 |

OTHER PUBLICATIONS

Notification of Reasons for Refusal dated Jan. 20, 2012, issued in corresponding Japanese Patent Application No. 2008-246428.

\* cited by examiner

*Primary Examiner* — Frank Font
(74) *Attorney, Agent, or Firm* — Westerman, Hattori, Daniels & Adrian LLP

(57) ABSTRACT

An object of the present invention is to provide a rolled web of optical film that has an optical orientation axis, which is less displaced from a predetermined angle throughout the entire area of the elongated rolled web, and can be easily produced according to the desired angle of the optical orientation axis, and a method of producing the rolled web of optical film. The rolled web of optical film includes an optical film layer having an optical orientation axis, and an adhesive film web including a release material layer and an adhesive material layer, the optical film layer being laid on the adhesive film web via the adhesive material layer and rolled up into a roll. The optical film layer is made up of plural optical film pieces that are arranged into a substantially elongated shape with end portions of the optical film pieces being adjacent to each other. The optical film pieces are formed by cutting an optical film web having an optical orientation axis, at least along cutting lines that cross the longitudinal direction of the optical film web. The optical film pieces are disposed on the adhesive film web to have the cutting lines oriented parallel to the longitudinal direction of the adhesive film web. Optical orientation axes of the optical film pieces each are oriented at a common angle relative to the longitudinal direction of the adhesive film web.

8 Claims, 4 Drawing Sheets

ROLLED WEB OF OPTICAL FILM AND METHOD OF PRODUCING THE SAME

CROSS REFERENCE TO RELATED APPLICATION

This application claims priority from Japanese Patent Application No. 2008-246428, which is incorporated herein by reference.

BACKGROUND OF THE INVENTION

1. Field of the Invention

The present invention relates mainly to a rolled web of optical film, in which an optical film having an optical orientation axis is rolled up into a roll, and a method of producing the rolled web of optical film, and more specifically relates to a rolled web of optical an, such as polarizing film, optical compensation film, etc., having an optical orientation axis oriented at a predetermined angle, and a method of producing the rolled web of optical film.

2. Description of the Related Art

In recent years, an optical film laminate having various kinds of optical films laminated together is used as a constitutional element of a liquid crystal display device. For example, an optical film laminate, in which a polarizing film that makes only the light vibrating in a specific direction pass therethrough is laminated with various kinds of optical compensation films that improve the drawback of visibility due to the birefringent property of a liquid crystal cell to be used, and the like, are known.

Optical films for use in these optical film laminates each have an optical orientation axis. When in producing an optical film laminate, the respective optical films must be laminated to each other to have an optical orientation axis of one optical film oriented at a predetermined angle relative to the optical orientation axis of the opposite optical film.

A generally employed method of producing an optical film laminate includes cutting sheets of film from an optical film web that is subjected to uniaxial stretching or biaxial stretching to have an optical orientation axis substantially parallel to or substantially orthogonal to the longitudinal direction of the film web, and laminating the sheets of film to each other to have an optical orientation axis of one sheet oriented at a predetermined angle relative to the optical orientation axis of the opposite sheet.

Also, a study is also made on a method of producing an optical film laminate by laminating plural optical films respectively having different angles of optical orientation axis. For example, as described in Patent Document 1, a study is made on a method, which uses a diagonally stretched film obtained by stretching a film web at a predetermined angle relative to the longitudinal direction of the film. The diagonally stretched film can be provided with an optical orientation axis corresponding to a desired angle by changing the stretching angle, and therefore it is known a method in which an optical film laminate is produced by preparing a diagonally stretched film for each of the desired angles of the optical orientation axis and laminating those prepared films together.
Patent Document 1: Japanese Patent Application Laid-open No. Hei-11-231129

However, the former method requires an operation of laminating one by one sheet members cut from an optical film web that has been prepared by uniaxial stretching or biaxial stretching, when in preparing an optical film laminate, which poses a problem of making it difficult to produce optical film laminates in mass quantities, and a problem of deteriorating yield due to the non-laminated areas caused depending on the size of sheet members or angle of laminating the sheet members.

On the other hand, a diagonally stretched film described in the aforesaid Patent Document 1 poses a problem of causing variation in angle of the optical orientation axis. Specifically, a diagonally oriented film, which is stretched by using a tenter-stretching machine to obtain a desired angle of the optical orientation axis, is easy to be influenced by a tension (tensile force) applied to a film before it is stretched, or fluctuation in stretching angle. The diagonally stretched film is curved when it is rolled up into a roll, and hence is partially stretched or shrunken. Because of this, the rolled film web is easy to cause an axial displacement of the optical orientation axis throughout the entire area of the rolled film web, and thus is difficult to produce a rolled web of optical film with a stabilized quality.

Because complicated settings must be made for a diagonally stretched film in terms of stretching angle (direction), stretching force or the like according to the desired angle of the optical orientation axis, preparation of plural optical films respectively having different angles of the optical orientation axis is very troublesome.

Because it is very difficult to form a diagonally stretched film with a desired width in a stretching step, when it is laminated with other film (e.g., a different optical film or adhesive film), it is necessary to prepare a diagonally stretched film having a width greater than the other film and cut the diagonally stretched film to the width of the other film, which invites deterioration in yield.

SUMMARY OF THE INVENTION

In consideration of the above problems associated with the prior arts, it is an object of the present invention to provide a rolled web of optical film that has an optical orientation axis, which is less displaced from a predetermined angle throughout the entire area of the elongated rolled web, and can be easily produced according to the desired angle of the optical orientation axis, and a method of producing the rolled web of optical film, as well as a rolled web of optical film that can be easily produced according to the desired width, thereby improving yield in laminating with another film.

In consideration of achieving the above object, according to the present invention, there is provided a rolled web of optical film that includes an optical film layer having an optical orientation axis, and an adhesive film web including a release material layer and an adhesive material layer, the optical film layer being laid on the adhesive film web via the adhesive material layer and rolled up into a roll, wherein:

the optical film layer is made up of plural optical film pieces that are arranged into a substantially elongated shape with end portions of the optical film pieces being adjacent to each other;

the optical film pieces are formed by cutting an optical film web having an optical orientation axis, at least along cutting lines that cross the longitudinal direction of the optical film web;

the optical film pieces are disposed on the adhesive film web to have the cutting lines oriented parallel to the longitudinal direction of the adhesive film web; and optical orientation axes of the optical film pieces each are oriented at a common angle relative to the longitudinal direction of the adhesive film web.

The term "web" is herein meant a long thin and flexible material having a longitudinal axis, which is generally processed by moving over rollers, and is stored and transported as rolls also known as coils.

The end portions of each of the optical film pieces may be any ones of the end sides forming each of the optical film pieces (excluding end sides formed by the cutting lines crossing the longitudinal direction of the optical film web). For example, when the crossing angle between the longitudinal direction of the optical film web and the cutting lines is small (e.g., less than 35°), the optical film pieces become relatively long. Accordingly, each optical film is sometimes divided into two small pieces, and these small pieces are arranged to have end sides other than the end sides (dividing end sides) formed by dividing the optical film piece facing one another, thereby allowing the two small pieces to be used as a single optical film piece. In this case, end sides of the optical, film piece formed by the dividing lines may be designated as the end portions of the optical film pieces mentioned above.

According to the rolled web of optical film having the above structure, the plural optical film pieces are formed by cutting the optical film web along the cutting lines crossing the longitudinal direction of the optical film web and arranged into a substantially elongated shape with end portions of the optical film pieces being adjacent to each other. Thus, it is possible to easily produce an optical orientation axis oriented at a desirable angle by changing the arranging angle of the optical film pieces. Furthermore, as an optical film web to be cut into optical film pieces, a uniaxial stretched film or the like having an optical orientation axis substantially parallel or substantially orthogonal to the longitudinal direction may be used. With this, it is possible to produce a rolled web of optical film that has an optical orientation axis, which is less displaced from a predetermined angle throughout the entire area of the rolled web.

Specifically, by forming optical film pieces by cutting an optical film web along cutting lines crossing the longitudinal direction of the optical film web at a predetermined angle, the optical film pieces are inclined at a predetermined angle and have two cutting lines oriented parallel to each other, while having a common optical orientation axis. Then, by disposing the optical film pieces to have the cutting lines oriented parallel to the longitudinal direction of the adhesive film web, the optical orientation axis of each of the optical film pieces is inclined at an angle equivalent to the inclined angle of the cutting lines.

That is, it is possible to allow the optical orientation axis of the optical film web, which has not yet been cut, to be oriented at varying angle by changing the angle of the cut lines along which the optical film web is cut. Therefore, it is possible to provide a rolled web of optical film that can easily produce an optical orientation axis oriented at a desirable angle.

Because a conventional uniaxial stretched film used as an optical film web causes less angular displacement of the optical orientation axis throughout the entire area, the optical film pieces each have an optical orientation axis oriented at a common angle by cutting the optical film web along the cutting lines oriented at a common angle. Therefore, by the arrangement where the optical film pieces are disposed to have the cutting lines of the optical film pieces oriented parallel to the longitudinal direction of the adhesive film web, it is possible to provide a rolled web of optical film that causes less angular displacement of the optical orientation axis throughout the entire are of the rolled web of optical film.

According to the present invention, it is possible to produce a rolled web of optical film having an optical orientation axis oriented at varying angle by a single optical film web. Therefore, by producing an optical film web having an optical orientation axis substantially parallel to or substantially orthogonal to (substantially parallel to the lateral direction), it is possible to apply it generally to a rolled web of optical film having an optical orientation axis oriented at varying angle.

As an optical film layer is made up of plural optical film pieces, it is possible to reduce influences of tensions applied to each of the optical film pieces when the intermediate product (an unrolled optical film made up of the optical film pieces) is held rolled up into a roll. For example, when the intermediate product is held rolled up into a roll with the optical film pieces facing outwards, the optical film pieces each are likely to be applied with tension in the longitudinal direction and thus are likely to cause angular displacement of the optical orientation axis even though it is small.

However, as plural optical film pieces are disposed independently of each other, spaces are caused between the optical film pieces so that influences of tension applied to one optical film piece are not transmitted to another optical film piece. Therefore, it is possible to prevent influences of tension applied to an optical film piece from being transmitted to the entire area of the rolled web of optical film and hence prevent angular displacement of the optical orientation axis. Furthermore, it is possible to prevent change in optical characteristics (especially R value of retardation value) due to the application of tensions onto the optical film pieces.

The optical film pieces are independently of each other disposed on the adhesive film web, that is, the adhesive material layer. Therefore, even if a rolled web of optical film is pulled out in the longitudinal direction and is used under the state where it is tensioned in the longitudinal direction so as not to become loose, this tension is applied to the release material layer while not directly applied to the optical film pieces. Thus, the optical film pieces are not likely to be stretched by this tension, thereby preventing unintentional changes in the angle of the optical orientation axis.

In the rolled web of optical film of the present invention, the optical film pieces are preferably disposed at an interval when the optical film pieces arranged into the substantially elongated shape are held rolled up into the roll. In other words, the optical film pieces are intermittently disposed while not being jointed to each other, when the optical film pieces arranged into the substantially elongated shape are held rolled up into the roll.

According to the rolled web of optical film having the above structure, the optical film pieces are disposed at an interval when the optical film pieces arranged into the substantially elongated shape are held rolled up into the roll. Therefore, for example, even if the optical film pieces are rolled up into a roll to face inwards, they do not abut with each other and thus are not damaged. The optical film pieces, which face inwards, become easy to be shrunken, and easy to cause angular displacement of the optical orientation axis, although it is small. However, as the optical film pieces are disposed at an interval, the influences of shrinking of one optical film piece are not transmitted to another optical film piece. Even when the optical film pieces are rolled up into a roll to face outwards, the optical film pieces do not abut with each other, as described above.

In the rolled web of optical film of the present invention, the cutting lines cross the longitudinal direction of the optical film web preferably at an angle of 35° to 90°.

According to the rolled web of optical film having the above structure, the optical film pieces each are unlikely to have a great length and thus are easy to be handled, so that it is possible to enhance the workability in disposing the optical film pieces. Therefore, it is possible to reduce an operation, such as dividing an optical film piece along a dividing line and place the divided pieces next to each another.

In the rolled web of optical film of the present invention, the cutting lines, along which the optical film web is cut to form the optical film pieces, are preferably disposed in parallel to each other at a predetermined interval along the longitudinal direction of the optical film web.

According to the rolled web of optical film having the above structure, it is possible to form an optical film layer having a desirable width by adjusting the interval between the cutting lines to a predetermined interval, when the optical film pieces are arranged into an elongated shape. Specifically, as the optical film pieces are disposed to have the cutting lines oriented parallel to the longitudinal direction of the optical film layer, the interval between the cutting lines becomes equivalent to the lateral length of the optical film layer. Thus, it is possible to easily form an optical film layer having a desirable width by adjusting the interval between the cutting lines. Hence, it is possible to form an optical film layer, having the same width as that of a different film (e.g., another optical film or an adhesive film) when the optical film layer is attached to the different film, and thus improve the yield when they have been attached together.

In the rolled web of optical film of the present invention, the optical film pieces preferably include at least one of a retardation film, a brightness enhancement film and a polarizing film.

According to another aspect of the present invention, there is provided a method of producing a rolled web of optical film that includes:

cutting an optical film web having an optical orientation axis along cutting lines, which cross the longitudinal direction of the optical film web, into plural optical film pieces;

disposing the optical film pieces on an adhesive film web, which includes a release material layer and an adhesive material layer, via the adhesive material layer, to be arranged into an elongated shape with end portions of the optical film pieces being adjacent to each other to form an elongated optical film layer, wherein the cutting lines are oriented parallel to the longitudinal direction of the adhesive film web and the optical orientation axes of the optical film pieces each oriented at a common angle relative to the longitudinal direction of the adhesive film web, when the optical film pieces are disposed on the adhesive film web; and rolling up the elongated optical film layer into a roll.

As described above, according to the rolled web of optical film and the method of producing the same, of the present invention, it is possible to provide a rolled web of optical film that has an optical orientation axis, which is less displaced from a predetermined angle throughout the entire area of the rolled web of optical film, and can be easily produced according to the desirable angle. Also, it is possible to provide a rolled web of optical film that can be easily produced according to the desirable width to increase the yield when it is attached to another film.

DESCRIPTION OF THE PREFERRED EMBODIMENTS

Now, the description will be made for an embodiment of the present invention with reference to FIGS. 1 to 4.

Figure 1A:
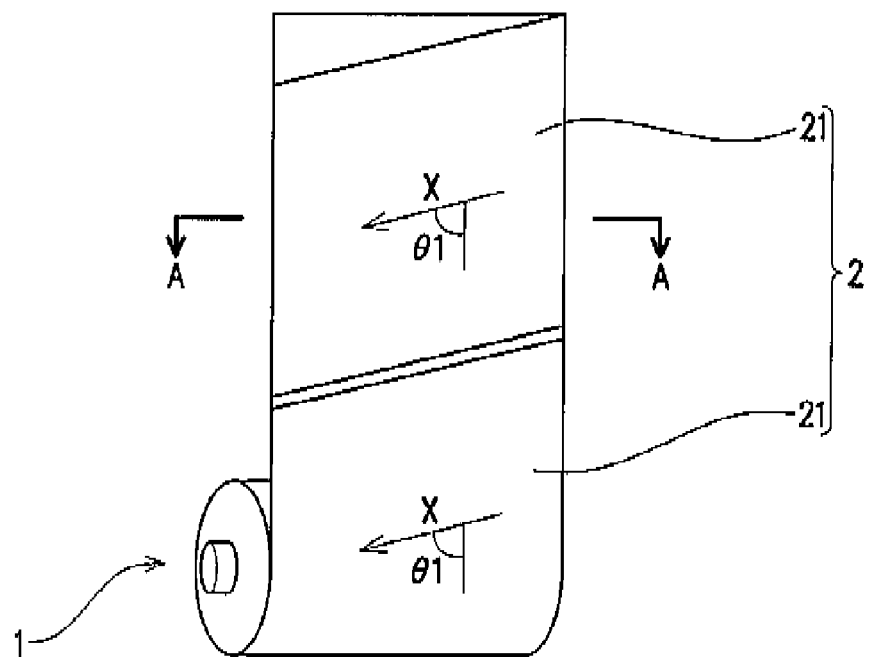
FIG. 1A is a view showing a rolled web of optical film of an embodiment of the present invention in a state in which the rolled web is partly unwound.
Figure 1B:
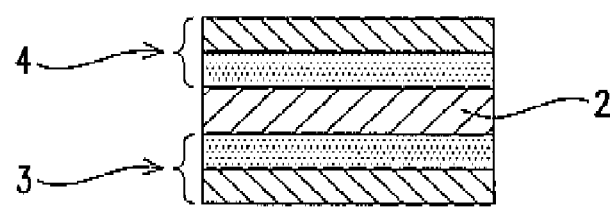
FIG. 1B is a cross sectional view taken along a line A-A in FIG. 1A.

A rolled web of optical film 1 of this embodiment is formed by rolling up an optical film layer 2 having an optical orientation axis into a roll. Specifically, as illustrated in FIG. 1, the rolled web of optical film 1 includes an optical film layer 2 formed by arranging optical film pieces 21, which are sheets of optical film, into a substantially elongated shape with end portions of the optical film pieces 21 adjacent to each other, an adhesive film web 3 with the optical film pieces 21 mounted thereon, and a protection layer 4 for protection of the surface of the optical film layer 2. FIGS. 1A and 1B show the rolled web of optical film 1 of this embodiment in a state in which the rolled web 1 is partly unwound.

The rolled web of optical film 1 has an optical orientation axis X oriented at a predetermined angle $\theta 1$ relative to the longitudinal direction of the rolled web. More specifically, the optical film pieces 21 are disposed to have the optical orientation axis X of each optical film piece 21 oriented at the predetermined angle $\theta 1$ relative to the longitudinal direction of the rolled web of optical film 1.

Figure 2:
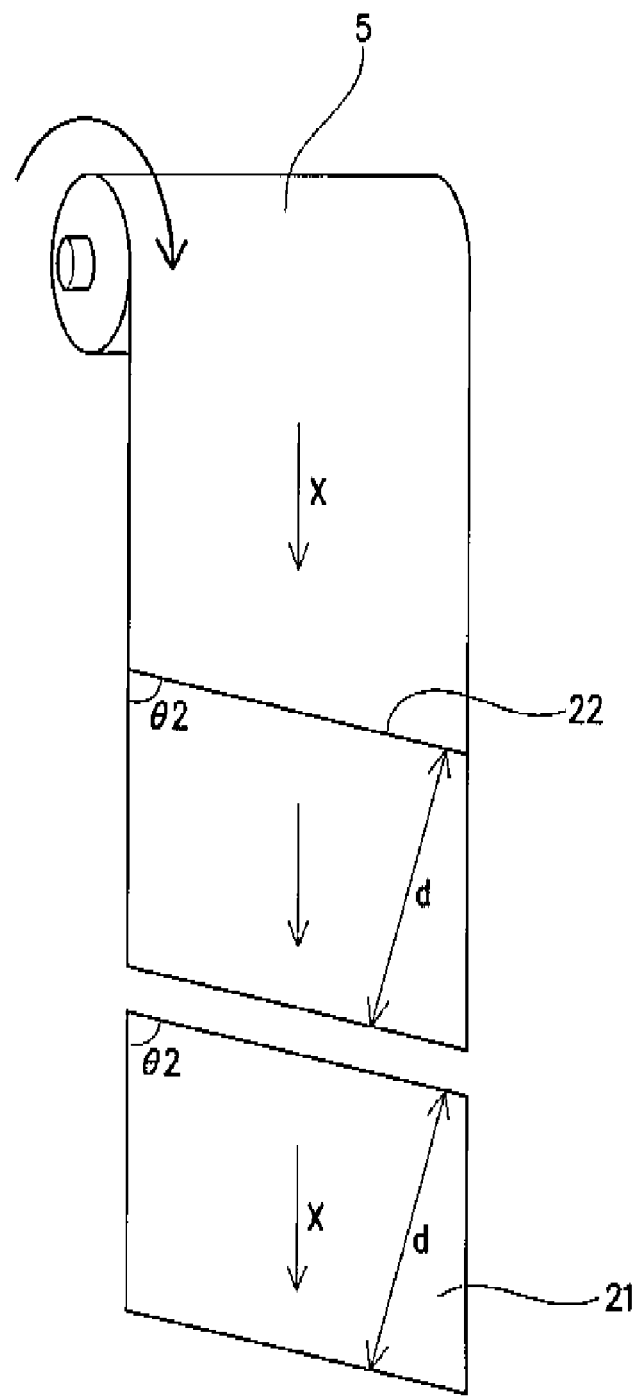
FIG. 2 is a view showing optical film pieces formed by cutting an optical film web of the rolled web of optical film.

As illustrated in FIG. 2, the optical film pieces 21 are formed by cutting an optical film web 5, which is an optical film having the optical orientation axis X and formed into an elongated shape, along cutting lines 22 crossing the longitudinal direction of the optical film web 5 at the predetermined angle $\theta 2$. The optical film web 5 has on both the front and back sides protection layers (not illustrated) that are easily releasable. That is, the optical film pieces 21 formed by cutting the optical film web 5 has on both the front and back sides the protection layers of the optical film web 5, so that one of the protection layers acts as a protection layer 4 for protection of the surface of the optical film layer 2.

The cutting lines 22 are formed at equal interval in the longitudinal direction of the optical film web 5, and it is preferable to have the interval matched with the width of the adhesive film web 3. By the interval of the cutting lines 22 is herein meant an interval d in a direction orthogonal to the two parallel cutting lines 22. The angle $\theta 2$ at which each cutting line 22 crosses the longitudinal direction of the optical film web 5 is preferably in the range of 35° to 90°.

The thus cut optical film pieces 21 have substantially the same shape. Specifically, they have a quadrangle shape or a parallelogram shape with the two parallel cutting lines 22 acting as two opposite sides.

The optical film web 5 has an optical orientation axis X parallel to the longitudinal direction or lateral direction. Specifically, a uniaxial stretched film or biaxial stretched film may be used. More specifically, a retardation film, a brightness enhancement film or a polarizing film, which has been subjected to uniaxial stretching or biaxial stretching, may be used. The thus obtained optical film web 5 causes less angular displacement of the optical orientation axis X throughout the entire area of the optical film web 5, and therefore is unlikely to cause angular displacement of the optical, orientation axis X throughout the entire area even in a production process of the rolled web of optical film 1.

A retardation film is herein meant a film that is capable of producing a phase difference when light passes therethrough. Specifically, the refractive index in-plane of this film is different so as to allow the phase of transmitted light to be advanced in a direction in which the refractive index is minimum and to be retarded in a direction in which the refractive index is maximum. In other words, the slow axis of a retardation film is meant a direction in which the phase of light transmitting the film is retarded, that is, a direction in which the refractive index becomes maximum in the film in-plane. That is, the slow axis of a retardation film is one of examples as an optical orientation axis in the present invention.

Specifically, the retardation film can be obtained by stretching a polymer film. For example, the retardation film can be obtained by applying tension onto an unstretched film at an appropriate temperature and increasing the molecular orientation along the stretching direction. An example of a polymer film includes a film which is produced by forming into a film shape at least one polymer material selected from the group consisting of acetate resin, polyester resin, polyethersulfone resin, polysulfone resin, polycarbonate resin, polyimide resin, polyimide resin, polyolefin resin, acrylic resin, polynorbornene resin, cellulose resin, polyarylate resin, polystyrene resin, polyvinyl alcohol resin, polyvinyl chloride resin, polyvinylidene chloride resin, polyacrylic resin, a mixture of a thermoplastic resin whose side chain has a substituted or unsubstituted imide group and a thermoplastic resin whose side chain has a substituted or unsubstituted phenyl group and a nitrile group, and a liquid crystal polymer. Examples of a film forming method include a casting method from solution and an extrusion molding method.

A brightness enhancement film is herein meant a film that has characteristics, in which, among lights incident from a light source such as a backlight of a liquid crystal display device, etc., linearly polarized light with a predetermined polarization axis, or circularly polarized light with a predetermined direction is transmitted, while other, light is not transmitted therethrough but is reflected. That is, a brightness enhancement film is to allow light from a light source such as a backlight to be incident into the brightness enhancement film to obtain a transmitted light in a predetermined polarized state, allow light other than the light in the predetermined polarized state not to transmit through the brightness enhancement film and therefore to be reflected, thereby allowing the reflected light to be reversed via a reflecting layer or the like provided on the back side of the brightness enhancement film to be incident into the brightness enhancement film again to increase the amount of light transmitted through the brightness enhancement film, while supply polarized light, which is not easy to be absorbed by a polarizer, thereby to increase the amount of light usable for a liquid crystal display device or the like and hence improve the brightness. An example of optical orientation axis in the brightness enhancement film includes a polarizing direction of transmitted light.

A polarizing film is herein meant a film that is capable of transmitting linearly polarized light when natural light is made incident on the polarizing film. Specifically, a polarizing film is designed to transmit one of polarizing elements of light made incident orthogonally, while block the other by absorption (or reflection or scattering). Specifically, the absorption axis of the polarizing film represents a direction in which the polarized elements are absorbed, and is one of the examples as an optical orientation axis in the present invention.

Examples of the polarizing film to be used in the present invention include a film produced by, for example, dyeing and absorbing a substrate film of, for example, polyvinyl alcohol with a dichroic material, such as iodine and organic dyestuffs, and then stretching the film. Generally, the direction in which the film has been stretched becomes the absorption axis.

Figure 3:
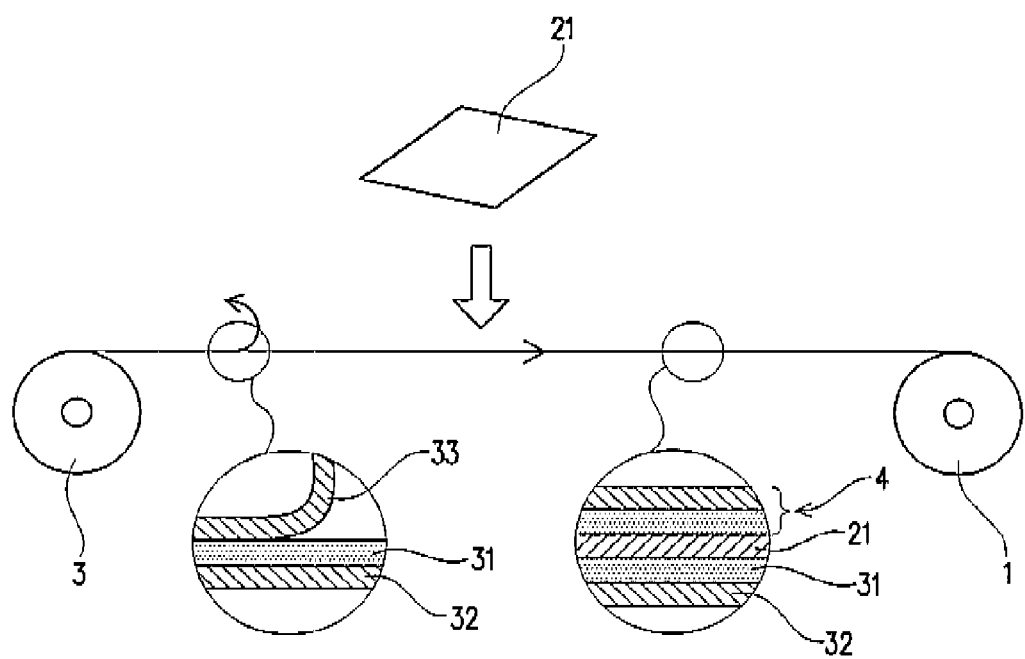
FIG. 3 is a view showing the structure of an adhesive Elm web of the rolled web of optical film, in which an adhesive material layer is covered on both sides with release material layers.

The adhesive film web 3, on which the optical film pieces 21 are to be mounted, has an elongated shape and is rolled up into a roll, as illustrated in FIG. 3. The width of the adhesive film web 3 is set to be substantially matched with the interval d of the cutting lines 22. The adhesive film web 3 has an adhesive material layer 31 that is covered on both the front and back sides with a release material layer 32 and a release material layer 33. When the optical film pieces 21 are to be mounted on the adhesive film web 3, the release material layer 33 is released from the adhesive film web 3, and the optical film pieces 21 with one of the protection layers released therefrom are successively attached to the exposed adhesive material layer 31.

The adhesive material layer 31 is herein meant a layer that is capable of providing adhesiveness to the optical film pieces 21 and thereby enabling the optical film pieces 21 to be attached to another member (e.g., other optical film pieces). The release material layers 32, 33 are herein meant layers structured so as to be temporarily laminated on the adhesive material layer 31 to protect the adhesive material layer 31 and to be able to be easily released from the adhesive material layer 31 when the adhesive material layer 31 is to be laminated with another member (e.g., optical film pieces 21).

Figure 4:
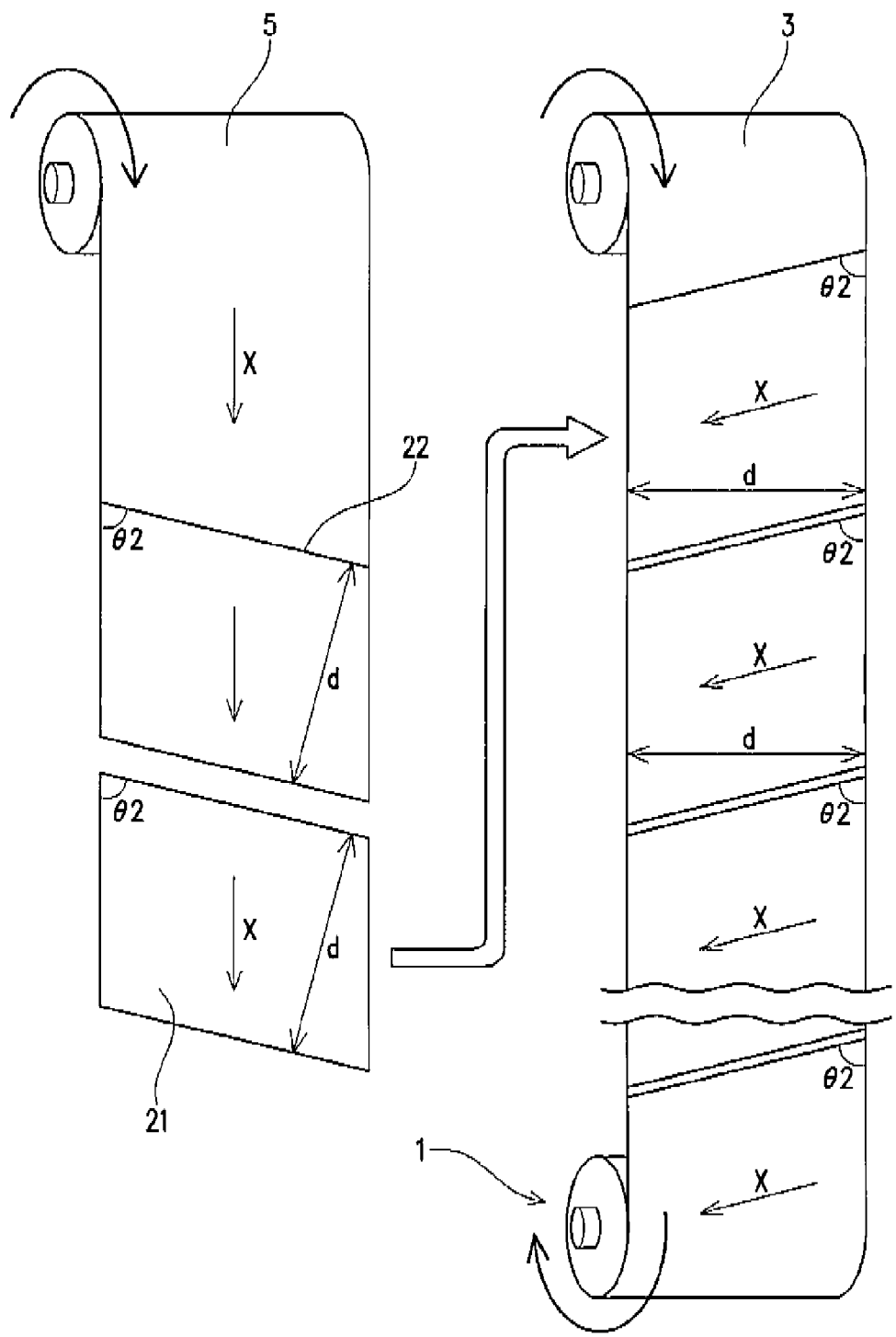
FIG. 4 is a view showing a step of mounting optical film pieces on an adhesive film web of the rolled web of optical film.

Now, the description will be made for a method of mounting the optical film pieces 21 on the adhesive film web 3. As illustrated in FIG. 4, the optical film pieces 21 cut from the optical film web 5 are disposed on the rolled web of optical film 1 to be parallel with the longitudinal direction of the rolled web of optical film 1. Specifically, the optical film pieces 21 are disposed to have the cutting lines 22 overlapped to the lateral ends of the adhesive film web 3, and the cutting lines 22 are oriented in a substantially straight line along the lateral end edges of the adhesive film web 3. At this moment, the optical film pieces 21 are disposed at an interval. Specifically, the optical film pieces 21 are disposed at an interval when the adhesive film web 3 is held rolled up into a roll with the optical film pieces 21, which are mounted on the adhesive film web 3, facing inward. More specifically, the interval between the adjacent optical film pieces 21 is preferably greater than the thickness of the optical film pieces 21.

With the above arrangement, the optical orientation axes X of the optical film pieces 21 are oriented at the predetermined angle θ1 relative to the longitudinal direction of the rolled web of optical film 1. Specifically, the optical film pieces 21 are rotated by a predetermined angle θ2 before they are mounted on the adhesive film web 3, and disposed on the adhesive film web 3 with these rotated positions held. Whereby, when the optical film web 5 has an optical orientation axis X parallel to the longitudinal direction thereof, the optical orientation axis X of the optical film web 5 (optical film pieces 21) is inclined by the predetermined angle θ2. Accordingly, the optical orientation axis X is oriented at the predetermined angle θ2 relative to the longitudinal direction of the rolled web of optical film 1. That is, the predetermined angle θ1 relative to the longitudinal direction of the rolled web of optical film 1 becomes the same as the angle θ2 at which the cutting lines 22 cross the longitudinal direction of the optical film web 5.

When the optical film web 5 has the optical orientation axis X parallel to the lateral direction of the optical film web 5, or the optical orientation axis X orthogonal to the longitudinal direction of the optical film web 5, the optical orientation axis X is oriented at an angle further inclined 90° from the predetermined angle θ2, relative to the longitudinal direction of the rolled web of optical film 1.

The optical film pieces 21 are rolled up into a roll together with the adhesive film web 3, which roll is served as a rolled web of optical film. At this moment, the optical film pieces 21 are rolled up into a roll preferably to face inwards of the roll, so that the optical film pieces 21 are prevented from being released from the adhesive film web 3. Also, the optical film pieces 21 are prevented from being damaged from the outside. As the optical film pieces 21 are disposed at an interval, they are unlikely to abut with each other.

The optical film pieces 21 may be rolled up into a roll to face outwards of the roll. With this rolling-up arrangement, the optical film pieces 21 are prevented from abutting with each other without the necessity to take into account the necessity to provide an interval between the optical film pieces 21. Thus, it is possible to prevent tensions applied to each optical film piece from being influenced onto the other optical film pieces, when they are rolled into a roll.

As described above, according to this embodiment of the present invention, the rolled web of optical film 1 has the optical orientation axis X, which is less displaced from a predetermined angle throughout the entire area of the elongated rolled web, and can be easily produced according to the desired angle.

Specifically, according to the rolled web of optical film 1, the optical film layer 2 is made up of plural optical film pieces 21, and the optical film pieces 21 are formed by cutting the optical film web 5 along the cutting lines 22, which cross the longitudinal direction of the optical film web 5 at the predetermined angle θ2, and are disposed to have the optical orientation axis X of each optical film piece 21 parallel to the longitudinal direction of the adhesive film web 3, and the optical orientation axes X of the optical film piece 21 are oriented at the common angle θ1 relative to the longitudinal direction of the adhesive film web 3. With this, it is possible to easily produce the rolled web of optical film 1 that has the optical orientation axis X oriented at a desired angle, and causes less angular displacement of the optical orientation axis X throughout the entire area of the rolled web of optical film 1.

As an additional advantageous effect, it is possible to produce the rolled web of optical film 1 having optical orientation axes X oriented at various angles from a single optical film web 5. Because of this, as the optical film web 5, it is possible to produce the optical film web 5 having the optical orientation axis X parallel to the longitudinal direction or orthogonal to the longitudinal direction (i.e., parallel to the width direction), which can be generally used for the rolled web of optical film 1 having the optical orientation axes X oriented at various angles.

The optical film layer 2 is made up of plural optical film pieces 21, and is disposed independently on the adhesive film web 3, that is, on the adhesive material layer 31. With this arrangement, even in a case where the rolled web of optical film is pulled out in the longitudinal direction and is tensioned so as not to become loose, the optical film pieces 21 are not further stretched by this tension, and thus it is possible to prevent the angle of an optical orientation axis or optical characteristics from being unintentionally changed.

The rolled web of optical film 1 has the optical film pieces 21 disposed at an interval when they are arranged into a substantially elongated shape and held rolled up into a roll. With this arrangement, even in a case where the optical film pieces 21 are rolled up into a roll to face inwards, the optical film pieces 21 are not damaged because the optical film pieces 21 do not abut with each other.

The rolled web of optical film of the present invention is not necessarily limited to the above embodiment, and may be subjected to various modifications without extending beyond the scope of the present invention.

For example, in the above embodiment, it is possible to adjust the angle θ1 of the optical orientation axis X relative to the longitudinal direction of the rolled web of optical film 1 according to the angle θ2 of the cutting lines 22 relative to the longitudinal direction of the optical film web 5. However, this is not essential. The optical film web 5 may be cut to have the cutting lines 22 orthogonal to the optical orientation axis X. By this cutting, it is possible to adjust the angle of the optical orientation axis X by adjusting the angle defined by the cutting lines 22 and the longitudinal direction of the adhesive film web 3 when the optical film pieces 21 are mounted on the adhesive film web 3. In this case, the optical film pieces 21 sometimes extend beyond the adhesive film web 3 depending on the size of the optical film pieces 21. These extending portions of the optical film pieces 21 may be cut along the adhesive film web 3 and laminated onto areas of the adhesive film web 3, on which no optical film pieces 21 are laminated.

In the above embodiment, the optical film pieces 21 are disposed on the adhesive film web 3 and the protection layer 4 is laid on the top side thereof. This is not essential. It is possible to employ an arrangement where the protection layer 4 is removed and another optical film pieces may be additionally laid on the optical film pieces 21. Specifically, it is possible to employ an arrangement, where an optical film layer made up of optical film pieces (first optical film pieces) disposed on the adhesive film web 3 is used as a first optical film layer, while a second optical film layer is laid on the first optical film layer. In this case, the optical film pieces (second optical film pieces) of the second optical film layer are formed by cutting a single elongated optical film by the cutting lines 22 in the same manner as the first optical film pieces. In this formation, the interval d between the cutting lines 22 is preferably substantially equal to the lateral length of the first optical film layer. By the formation of the cutting lines 22, the first optical film layer is laminated onto the second optical film layer without excessive portions and thus improve the yield. As the second optical film pieces, optical film pieces formed from the elongated optical film commonly used for the first optical film layer may be used, and optical film pieces formed from an elongated optical film possessing different properties from those of the first optical film layer may be used. A surface protection film may be further laminated onto the first optical film layer or the second optical film layer.

In the above embodiment, the optical film pieces 21 are disposed on the adhesive film web 3, providing an interval between the optical film pieces 21. This is not essential. The optical film pieces 21 may be disposed in close contact with each other without an interval.

This specification is by no means intended to restrict the present invention to the preferred embodiments set forth therein. Various modifications to the rolled web of optical film and method of producing the same, as described herein, may be made by those skilled in the art without departing from the spirit and scope of the present invention as defined in the appended claims.

What is claimed is:

1. A rolled web of optical film comprising an optical film layer having an optical orientation axis, and an adhesive film web including a release material layer and an adhesive material layer, the optical film layer being laid on the adhesive film web via the adhesive material layer and rolled up into a roll, wherein:

the optical film layer is made up of plural optical film pieces that are arranged into a substantially elongated shape with end portions of the optical film pieces being adjacent to each other;

the optical film pieces are formed by cutting an optical film web having an optical orientation axis, at least along cutting lines that cross the longitudinal direction of the optical film web;

the optical film pieces are disposed on the adhesive film web to have the cutting lines oriented parallel to the longitudinal direction of the adhesive film web; and optical orientation axes of the optical film pieces each are oriented at a common angle relative to the longitudinal direction of the adhesive film web.

2. The rolled web of optical film according to claim 1, wherein the optical film pieces are disposed at an interval when the optical film pieces arranged into the substantially elongated shape are held rolled up into the roll.

3. The rolled web of optical film according to claim 1, wherein the cutting lines cross the longitudinal direction of the optical film web at an angle of 35° to 90°.

4. The rolled web of optical film according to claim 1, wherein the cutting lines, along which the optical film web is cut to form the optical film pieces, are disposed at a predetermined interval in parallel to the longitudinal direction of the optical film web.

5. The rolled web of optical film according to claim 1, wherein the optical film pieces comprise at least one of a retardation film, a brightness enhancement film and a polarizing film.

6. A method of producing a rolled web of optical film comprising:

cutting an optical film web having an optical orientation axis along cutting lines, which cross the longitudinal direction of the optical film web, into plural optical film pieces;

disposing the optical film pieces on an adhesive film web, which includes a release material layer and an adhesive material layer, via the adhesive material layer, to be arranged into an elongated shape with end portions of the optical film pieces being adjacent to each other to form an elongated optical film layer, wherein the cutting lines are oriented parallel to the longitudinal direction of the adhesive film web and the optical orientation axes of the optical film pieces each are oriented at a common angle relative to the longitudinal direction of the adhesive film web, when the optical film pieces are disposed on the adhesive film web; and rolling up the elongated optical film layer into a roll.

7. The rolled web of optical film according to claim 1, wherein the optical film pieces are disposed at an interval which is greater than the thickness of the optical film pieces.

8. The rolled web of optical film according to claim 4, wherein the interval of the cutting lines is substantially equal to the width of the adhesive film web, the width being orthogonal to the longitudinal direction of the adhesive film web, and the optical film pieces are disposed to have the cutting lines overlapped to the lateral ends of the adhesive film web and the cutting lines are oriented in a straight line along the lateral end edges of the adhesive film web.

* * * * *